(12) United States Patent
Abusleme et al.

(10) Patent No.: US 12,494,488 B2
(45) Date of Patent: Dec. 9, 2025

(54) HIGH PERFORMANCE BINDERS FOR LITHIUM BATTERY ELECTRODES

(71) Applicant: SYENSQO SPECIALTY POLYMERS ITALY S.p.A., Bollate (IT)

(72) Inventors: Julio A. Abusleme, Saronno (IT); Ségolène Brusseau, Tavaux (FR); Andrea Vittorio Oriani, Milan (IT); Michele Fiore, Siena (IT); Roberto Biancardi, Bellinzago Lombardo (IT)

(73) Assignee: SYENSQO SPECIALTY POLYMERS ITALY S.p.A., Bollate (IT)

( * ) Notice: Subject to any disclaimer, the term of this patent is extended or adjusted under 35 U.S.C. 154(b) by 0 days.

(21) Appl. No.: 18/569,117

(22) PCT Filed: Jun. 6, 2022

(86) PCT No.: PCT/EP2022/065290
§ 371 (c)(1),
(2) Date: Dec. 11, 2023

(87) PCT Pub. No.: WO2022/258551
PCT Pub. Date: Dec. 15, 2022

(65) Prior Publication Data
US 2024/0290980 A1    Aug. 29, 2024

(30) Foreign Application Priority Data
Jun. 10, 2021    (EP) .................... 21305792

(51) Int. Cl.
| | |
|---|---|
| *C08F 220/06* | (2006.01) |
| *C08F 214/22* | (2006.01) |
| *C09D 127/16* | (2006.01) |
| *H01M 4/04* | (2006.01) |
| *H01M 4/139* | (2010.01) |
| *H01M 4/62* | (2006.01) |
| *H01M 10/0525* | (2010.01) |

(52) U.S. Cl.
CPC ........ *H01M 4/623* (2013.01); *C08F 214/225* (2013.01); *C09D 127/16* (2013.01); *H01M 4/0404* (2013.01); *H01M 4/043* (2013.01); *H01M 4/139* (2013.01); *H01M 10/0525* (2013.01)

(58) Field of Classification Search
CPC ........... C08F 214/225; C08F 216/1416; C08F 220/06; C08F 220/282; H01M 4/623; C09D 127/16
See application file for complete search history.

(56) References Cited

U.S. PATENT DOCUMENTS

| | | |
|---|---|---|
| 4,016,345 A | 4/1977 | Holmes |
| 4,725,644 A | 2/1988 | Malhotra |
| 6,479,591 B2 | 11/2002 | Kapeliouchko et al. |

FOREIGN PATENT DOCUMENTS

| | | | |
|---|---|---|---|
| JP | H07258499 A | 10/1995 | |
| WO | 2008129041 A1 | 10/2008 | |
| WO | WO-2019199753 A1 * | 10/2019 | ............ B01D 69/08 |
| WO | 2021/023707 A1 | 2/2021 | |

OTHER PUBLICATIONS

International Search Report issued in International Application No. PCT/EP2022/065290 mailed on Sep. 26, 2022 (4 pages).
Written Opinion issued in International Application No. PCT/EP2022/065290 mailed on Sep. 26, 2022 (7 pages).

* cited by examiner

*Primary Examiner* — Catherine S Branch
(74) *Attorney, Agent, or Firm* — Osha Bergman Watanabe & Burton LLP

(57) ABSTRACT

The present invention pertains to vinylidene fluoride copolymers comprising recurring units derived from hydrophilic monomers and to their use as binder for electrodes in Li-ion batteries.

20 Claims, No Drawings

HIGH PERFORMANCE BINDERS FOR LITHIUM BATTERY ELECTRODES

CROSS-REFERENCE TO RELATED APPLICATIONS

This application is a national stage entry under 35 U.S.C. § 371 of International Application No. PCT/EP2022/065290 filed on Jun. 6, 2022, which claims priority to European application 21305792.0 filed on Jun. 10, 2021. The entire contents of these applications are explicitly incorporated herein by this reference.

TECHNICAL FIELD

The present invention pertains to vinylidene fluoride copolymers comprising recurring units derived from hydrophilic monomers and to their use as binder for electrodes in Li-ion batteries.

BACKGROUND ART

Fluoropolymers are known in the art to be suitable as binders for the manufacture of electrodes for use in electrochemical devices such as secondary batteries.

In particular, WO 2008/129041 (SOLVAY SPECIALTY POLYMERS ITALY S.P.A.) discloses linear semi-crystalline vinylidene fluoride (VDF) copolymers comprising from 0.05% to 10% by moles of recurring units derived from (meth)acrylic monomers and uses thereof as binder in electrodes for lithium-ion batteries.

In general, increasing the fluoropolymers molecular weight is known to increase the performances of articles made from these materials, in particular in terms of mechanical properties and in terms of adhesion of the electrodes to the current collector.

However, increasing the fluoropolymers molecular weight will increase the viscosity of the electrode-forming formulation including the same, also called electrode slurry, making much more difficult the handling and the coating process in the fabrication of electrodes.

In the technical field of batteries, notably of lithium batteries, the problem of providing electrode binders characterized by very good adhesion that at the same time do not impact negatively on the fabrication process of the electrodes, such as by an increase of the slurry viscosity to produce the same, is felt.

This invention provides a solution to this problem by combining easiness in the electrode fabrication process by dealing with electrode-forming formulations having low viscosity at low shear rates, which allow the provision of electrodes having a very high adhesion towards the current collector.

SUMMARY OF INVENTION

It has been found that certain vinylidene fluoride copolymers randomly including certain vinyl monomers comprising oxygenated functional groups together with certain carboxy group-containing vinyl monomers are endowed with very good adhesion to metal substrates and can be used in the preparation of electrode-forming compositions having low viscosity at low shear rates.

It is thus an object of the invention a fluoropolymer [polymer (F)] comprising:
(i) recurring units derived from vinylidene fluoride (VDF) monomer;
(ii) recurring units derived from at least one vinyl monomer (HA) of formula (I)

$$R^1R^2C=CR^3-R_x \qquad (I)$$

wherein $R^1$, $R^2$ and $R^3$, equal to or different from each other, are independently selected from a hydrogen atom, a halogen atom, and a $C_1$-$C_5$ hydrocarbon group, and wherein $R_x$ is a $C_3$-$C_{20}$ linear or branched hydrocarbon chain moiety comprising at least two functional groups independently selected from the group consisting of ether (—O—), ketone (—C=O—), epoxy, per-carbonate (—O—CO—O—) and ester (—OCO—);
(iii) recurring units derived from at least one carboxyl group-containing vinyl monomer (CA), wherein monomer (CA) is different from monomer (HA);
wherein the total amount of each monomer (HA) and (CA) in said polymer (F) is of at most 5.0% by moles, preferably at most 1.5% by moles, with respect to the total moles of recurring units of polymer (F); and wherein of at least 50% of monomer (CA) is randomly distributed into said polymer (F).

A second object of the present invention pertains to an electrode-forming composition (C) comprising:
a) at least one electrode active material (AM);
b) at least one binder (B), wherein binder (B) comprises at least one polymer (F) as above defined; and
c) at least one solvent (S).

In another object, the present invention pertains to the use of the electrode-forming composition (C) in a process for the manufacture of an electrode [electrode (E)], said process comprising:
(A) providing a metal substrate having at least one surface;
(B) providing an electrode-forming composition (C) as above defined;
(C) applying the composition (C) provided in step (B) onto the at least one surface of the metal substrate provided in step (A), thereby providing an assembly comprising a metal substrate coated with said composition (C) onto the at least one surface;
(D) drying the assembly provided in step (C);
(E) submitting the dried assembly obtained in step (D) to a compression step to obtain the electrode (E) of the invention.

In a further object, the present invention pertains to the electrode (E) obtainable by the process of the invention.

In still a further object, the present invention pertains to an electrochemical device comprising at least one electrode (E) of the present invention.

DETAILED DESCRIPTION

By the term "recurring unit derived from vinylidene fluoride" (also generally indicated as vinylidene difluoride 1,1-difluoroethylene, VDF), it is intended to denote a recurring unit of formula —$CF_2$—$CH_2$—.

Suitable monomers (HA) are compounds of formula (I)

$$R^1R^2C=CR^3-R_x \qquad (I)$$

wherein $R^1$, $R^2$ and $R^3$, equal to or different from each other, are independently selected from a hydrogen atom, a halogen atom, and a $C_1$-$C_5$ hydrocarbon group, and wherein $R_x$ is a $C_3$-$C_{20}$, preferably $C_4$-$C_{15}$ linear or branched hydrocarbon chain moiety comprising at least two functional groups independently selected from the group consisting of ether (—O—), ketone (—C=O—), epoxy, per-carbonate (—O—CO—O—) and ester (—OCO—).

According to a preferred embodiment, $R_x$ in formula (I) is preferably a $C_3$-$C_{20}$, preferably $C_4$-$C_{15}$ linear or branched hydrocarbon chain moiety comprising at least three functional groups independently selected from the group consisting of ether (—O—), ketone (—C=O—), epoxy, percarbonate (—O—CO—O—) and ester (—OCO—). Preferably $R^1$, $R^2$ and $R^3$ are H atoms.

Non-limitative examples of monomers (HA) of formula (I) include, notably:
allyl glycidyl ether (AGE),
ethylene glycol alkyl ether acrylates of formula

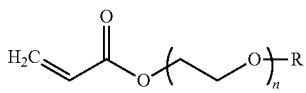

such as di(ethylene glycol) ethyl ether acrylate (DEGEEA);
(meth) acryloyloxyalkyl succinic acid, such as (meth) acryloyloxyethyl succinic acid and (meth) acryloyloxypropyl succinic acid;
and mixtures thereof.

Preferably, the at least one monomer (HA) is selected from allyl glycidyl ether (AGE) and di(ethylene glycol) ethyl ether acrylate (DEGEEA).

Suitable carboxyl group-containing vinyl monomers (CA) are compounds of formula (II):

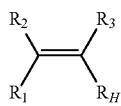

(II)

wherein:
$R_1$, $R_2$ and $R_3$, equal to or different from each other, are independently selected from a hydrogen atom, a halogen atom and a $C_1$-$C_3$ hydrocarbon group and $R_H$ is a $C_1$-$C_{20}$ hydrocarbon moiety comprising at least one carboxyl group. Preferably, $R_1$, $R_2$ and $R_3$ are hydrogen atoms.

In a preferred embodiment, monomers (CA) are compounds of formula (IIa):

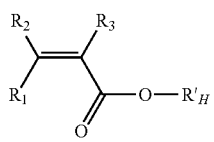

(IIa)

wherein
$R_1$, $R_2$ and $R_3$, equal to or different from each other, are independently selected from a hydrogen atom and a $C_1$-$C_3$ hydrocarbon group and $R'_H$ is a hydrogen or a $C_2$-$C_{15}$ hydrocarbon moiety comprising at least one carboxyl group.

$R'_H$ may further contain in the chain one or more functional groups comprising oxygen atoms.

Non-limitative examples of monomers (CA), notably:
acrylic acid (AA),
(meth)acrylic acid,
2-carboxyethyl (meth) acrylate,
3-butenoic acid,
(meth) acryloyloxyethyl succinic acid,
(meth) acryloyloxypropyl succinic acid,
3-(allyloxy)propanoic acid,
and mixtures thereof.

Preferably, the at least one monomer (CA) is acrylic acid (AA).

In a preferred embodiment of the present invention, monomer (CA) is acrylic acid and monomer (HA) does not contain any carboxylic groups.

The molar ratio between recurring units (ii) and recurring units (iii) in polymer (F) is preferably comprised in the range from 20:1 to 1:20, preferably from 10:1 to 1:10, more preferably from 1:5 to 5:1.

It is essential that in polymer (F) at least 50% of monomer (CA) be randomly distributed into said polymer (F).

It is known in the art that a continuous feeding of a comonomer of VDF during VDF polymerization will lead to a random distribution of said comonomer in the polymer chains where the sequences VDF-(comonomer)-VDF are present in general in majority.

Thus, when polymer (F) is prepared by a polymerization reaction that comprises continuously feeding monomer (CA) during VDF polymerization, a random distribution of monomer (CA) in the polymer chains is present, with sequences VDF-(CA)-VDF being obtained.

More preferably, in polymer (F) at least 70% of monomer (CA) is randomly distributed into said polymer (F).

The expression "randomly distributed monomer (CA)" is intended to denote the presence of sequences VDF-(CA)-VDF, and the amount of randomly distributed monomer (CA) is determined as the percent ratio between the average number of said VDF-(CA)-VDF sequences and the total average number of (CA) monomer recurring units.

When each of the (CA) recurring units is isolated, that is to say comprised between two recurring units of VDF monomer, the average number of (CA) sequences equals the average total number of (CA) recurring units, so the fraction of randomly distributed units (CA) is 100%: this value corresponds to a perfectly random distribution of (CA) recurring units. Thus, the larger is the number of isolated (CA) units with respect to the total number of (CA) units, the higher will be the percentage value of fraction of randomly distributed units (CA), as above described.

In a preferred embodiment of the present invention, also a fraction of monomer (HA) is randomly distributed into said polymer (F).

When both the monomer (HA) and the monomer (CA) are fed continuously during VDF polymerization, a random distribution of both comonomers (HA) and (CA) in the polymer chains is present, with sequences VDF-(HA)-VDF and VDF-(CA)-VDF being obtained. The percentage amount of total randomly distributed monomers (HA) and (CA), is determined as the percent ratio between the average number of said VDF-(CA)-VDF plus VDF-(HA)-VDF sequences, and the total average number of monomer (CA) plus monomer (HA) monomer recurring units.

According to this preferred embodiment, at least 50%, more preferably at least 70%, of total monomer (CA) plus the monomer (HA) is randomly distributed into said polymer (F).

In a further aspect, therefore, the present invention provides a fluoropolymer [polymer (F)] comprising:
(i) recurring units derived from vinylidene fluoride (VDF) monomer;

(ii) recurring units derived from at least one vinyl monomer (HA) of formula (I)

wherein $R^1$, $R^2$ and $R^3$, equal to or different from each other, are independently selected from a hydrogen atom, a halogen atom, and a $C_1$-$C_5$ hydrocarbon group, and wherein $R_x$ is a is a $C_3$-$C_{20}$ linear or branched hydrocarbon chain moiety comprising at least two functional groups independently selected from the group consisting of ether (—O—), ketone (—C=O—), epoxy, per-carbonate (—O—CO—O—) and ester (—OCO—);

(iii) recurring units derived from at least one carboxyl group-containing vinyl monomer (CA), wherein monomer (CA) is different from monomer (HA);

wherein the total amount of each monomer (HA) and (CA) in said polymer (F) is of at most 5.0% by moles, preferably at most 1.5% by moles, with respect to the total moles of recurring units of polymer (F); and wherein both monomer (HA) and monomer (CA) are randomly distributed into said polymer (F) and the total percentage of randomly distributed monomers (HA) and (CA) is of at least 50%, more preferably at least 70%.

The analytical determination of the total amount of randomly distributed monomers (HA) and (CA) may be carried out by measuring the sequences VDF-(comonomer)-VDF by $^{19}$F-NMR and the total amount of monomers in the polymer by one or more of these techniques, $^{19}$F-NMR, $^1$H-NMR, titration of carboxyl groups, FT-IR or others.

Polymer (F) comprises preferably at least 0.001%, more preferably at least 0.01% moles of recurring units derived from said monomer (HA).

Polymer (F) comprises preferably at most 5.0%, more preferably at most 3.0% moles, even more preferably at most 2.0% moles of recurring units derived from monomer (HA).

Polymer (F) comprises preferably at least 0.01%, more preferably at least 0.02% moles of recurring units derived from said monomer (CA).

Polymer (F) comprises preferably at most 5.0%, more preferably at most 3.0% moles, even more preferably at most 2.0% moles of recurring units derived from monomer (CA).

Excellent results have been obtained using a polymer (F) comprising at least 70% by moles of recurring units derived from VDF.

The polymer (F) can be an elastomer or a semi-crystalline polymer, preferably being a semi-crystalline polymer.

As used herein, the term "semi-crystalline" means a fluoropolymer that has, besides the glass transition temperature Tg, at least one crystalline melting point on DSC analysis. For the purposes of the present invention a semi-crystalline fluoropolymer is hereby intended to denote a fluoropolymer having a heat of fusion of from 10 to 90 J/g, preferably of from 30 to 80 J/g, more preferably of from 35 to 75 J/g, as measured according to ASTM D3418-08.

To the purpose of the invention, the term "elastomer" is intended to designate a true elastomer or a polymer resin serving as a base constituent for obtaining a true elastomer.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Preferably, the intrinsic viscosity of polymer (F), measured in dimethylformamide at 25° C., is between 0.05 l/g and 0.80 l/g more preferably between 0.15 l/g and 0.60 l/g, even more preferably between 0.20 l/g and 0.50 l/g The polymer (F) of the present invention usually has a melting temperature (Tm) comprised in the range from 120 to 200° C.

The polymer (F) of the present invention possesses a quasi-linear structure, with a very low amount of branching, which results in the insoluble fraction due to long branched chains being substantially decreased.

The polymer (F) of the present invention has in fact preferably a low fraction of insoluble components in standard polar aprotic solvents for VDF polymers, such as NMP. More preferably, solutions of polymer (F) in said standard polar aprotic solvents remain homogeneous and stable for several weeks, with substantially no insoluble residue.

Thanks to the low amount of insoluble components, the GPC and NMR analyses of polymer (F) are not affected, and there are no problems of reliability and reproducibility.

The melting temperature may be determined from a DSC curve obtained by differential scanning calorimetry (hereinafter, also referred to as DSC).

In the case where the DSC curve shows a plurality of melting peaks (endothermic peaks), the melting temperature (Tm) is determined on the basis of the peak having the largest peak area.

The polymer (F) may further comprise recurring units derived from one or more fluorinated comonomers (CF) different from VDF.

By the term "fluorinated comonomer (CF)", it is hereby intended to denote an ethylenically unsaturated comonomer comprising at least one fluorine atoms.

Non-limitative examples of suitable fluorinated comonomers (CF) include, notably, the followings:
(a) $C_2$-$C_8$ fluoro- and/or perfluoroolefins such as tetrafluoroethylene (TFE), hexafluoropropylene (HFP), pentafluoropropylene and hexafluoroisobutylene;
(b) $C_2$-$C_8$ hydrogenated monofluoroolefins, such as vinyl fluoride; 1,2-difluoroethylene and trifluoroethylene;
(c) perfluoroalkylethylenes of formula $CH_2$=CH—$R_{f0}$, wherein $R_{f0}$ is a $C_1$-$C_6$ perfluoroalkyl group;
(d) chloro- and/or bromo- and/or iodo-$C_2$-$C_6$ fluoroolefins such as chlorotrifluoroethylene (CTFE).
(e) perfluoro(alkyl)vinyl ethers, such as perfluoro(methyl) vinyl ether (PMVE), perfluoro(ethyl) vinyl ether (PEVE) and perfluoro(propyl)vinyl ether (PPVE);
(f) perfluoro(1,3-dioxole); perfluoro(2,2-dimethyl-1,3-dioxole) (PDD).

The fluorinated comonomer (CF) is preferably HFP.

In one preferred embodiment, polymer (F) is semi-crystalline and comprises from 0.1 to 10.0% by moles, preferably from 0.3 to 5.0% by moles, more preferably from 0.5 to 3.0% by moles of recurring units derived from said fluorinated comonomer (CF).

It is understood that chain ends different from those above defined, defects or other impurity-type moieties might be comprised in the polymer (F) without these impairing its properties.

The polymer (F) more preferably comprises recurring units derived from:
at least 70% by moles, preferably at least 75% by moles, more preferably at least 85% by moles of vinylidene fluoride (VDF),
from 0.005% to 1.5% by moles, preferably from 0.01% to 1.0% by moles of at least one monomer (HA);
from 0.01% to 1.5% by moles, preferably from 0.01% to 1.0% by moles of at least one vinyl monomer (CA);

optionally from 0.5 to 3.0% by moles of recurring units derived from at least one fluorinated comonomer (CF).

The polymer (F) of the present invention preferably comprises end groups of formula (III):

wherein RO is a divalent radical containing at least one oxygen atom, $R_a$ is a $C_1$-$C_5$ linear or branched hydrocarbon group and $R_b$ is hydrogen or a $C_1$-$C_5$ linear or branched hydrocarbon group and x is an integer selected from 1 and zero, wherein said end groups are present in an amount of at least 1/10000 VDF units, preferably higher than 1.5/10000 VDF units, more preferably higher than 2/10000 VDF units.

Non limitative examples of divalent radical RO include, notably:
ether (—O—),
ester (—O—CO—),
ketone (—CO—),
epoxide, and
per-carbonate (—O—CO—O—) groups.

In a preferred embodiment of the present invention, RO is a divalent radical containing at least two oxygen atoms. More preferably, RO is a per-carbonate group.

Preferably, $R_a$ and $R_b$ are both $C_2$-$C_3$ linear or branched alkyl radicals, more preferably $C_3$ linear or branched alkyl radicals.

Preferably, x is zero.

The polymer (F) of the present invention may be obtained by polymerization of a VDF monomer, at least one monomer (HA), at least one monomer (CA) and optionally at least one comonomer (CF), either in suspension in organic medium, according to the procedures described, for example, in WO 2008129041, or in aqueous emulsion, typically carried out as described in the art (see e.g. U.S. Pat. Nos. 4,016,345, 4,725,644 and 6,479,591).

The preferred process for preparing the polymer (F) comprises polymerizing the vinylidene fluoride (VDF) monomer, monomer (HA) and monomer (CA), and optionally comonomer (CF), in an aqueous medium in the presence of a radical initiator, said process comprising
continuously feeding an aqueous solution comprising monomer (HA) and monomer (CA); and
maintaining the pressure in said reactor vessel exceeding the critical pressure of the vinylidene fluoride.

Suitable initiator known for the polymerization of fluorinated monomers are organic peroxides, such as those selected from the group consisting of: dialkyl peroxides, diacyl-peroxides, peroxyesters, and peroxydicarbonates.

Exemplary dialkyl peroxides is di-t-butyl peroxide, of peroxyesters are t-butyl peroxypivalate and t-amyl peroxypivalate, and of peroxydicarbonate, are di(ethyl) peroxydicarbonate, di(n-propyl) peroxydicarbonate, diisopropyl peroxydicarbonate, di(sec-butyl) peroxydicarbonate, di(2-ethylhexyl) peroxydicarbonate and di(4-tert-butylcyclohexyl) peroxydicarbonate.

Preferably, the initiator used for preparing polymer (F) of the present invention is an organic peroxide, more preferably is selected from di(ethyl) peroxydicarbonate, di(n-propyl) peroxydicarbonate, di(iso-propyl) peroxydicarbonate and di(4-tert-butylcyclohexyl) peroxydicarbonate.

The quantity of an initiator required for a polymerization is related to its activity and the temperature used for the polymerization. The total amount of initiator used is generally between 100 to 30000 ppm by weight on the total monomer weight used.

The initiator may be added in pure form, in solution, in suspension, or in emulsion, depending upon the initiator chosen.

A chain transfer agents, CTA, can be added to the polymerization. Suitable CTA for this polymerization are known in the art and are typically short hydrocarbon chains like ethane and propane, esters such as ethyl acetate or diethyl maliate, diethylcarbonate and others. When an organic peroxide is used as the initiator, it could act also as effective CTA during the course of free radical polymerization. The additional CTA however, may be added all at once at the beginning of the reaction, or it may be added in portions, or continuously throughout the course of the reaction. The amount of CTA and its mode of addition depend on the desired properties.

In the preferred preparation process, pressure is maintained above critical pressure of vinylidene fluoride. Generally, the pressure is maintained at a value of more than 50 bars, preferably of more than 75 bars, even more preferably of more than 100 bars.

It is essential that a continuous feeding of an aqueous solution containing monomer (HA) and monomer (CA) is carried out mostly during the whole duration of polymerization run.

It is thus possible to obtain a nearly statistic distribution of both the monomer (HA) and monomer (CA) within the VDF monomer polymer backbone of polymer (F).

The expressions "continuous feeding" or "continuously feeding" means that slow, small, incremental additions the aqueous solution of monomer (HA) and monomer (CA) take place during the polymerization.

The aqueous solution of monomer (HA) and monomer (CA) continuously fed during polymerization amounts for at least 50% wt of the total amount of monomer (HA) and monomer (CA) supplied during the reaction (i.e. initial charge plus continuous feed). Preferably at least 60% wt, more preferably at least 70% wt, most preferably at least 80% wt of the total amount of monomer (HA) and monomer (CA) is continuously fed during polymerization. An incremental addition of VDF monomer can be effected during polymerization, even if this requirement is not mandatory. Generally, the process of the invention is carried out at a temperature of at least 30° C., preferably of at least 35° C.

When the polymerization is carried out in suspension, polymer (F) is typically provided in form of powder.

When the polymerization to obtain polymer (F) is carried out in emulsion, polymer (F) is typically provided in the form of an aqueous dispersion (D), which may be used as directly obtained by the emulsion polymerization or after a concentration step.

Polymer (F) obtained by emulsion polymerization can be isolated from the aqueous dispersion (D) by concentration and/or coagulation of the dispersion and obtained in powder form by subsequent drying.

Polymer (F) in the form of powder may be optionally further extruded to provide polymer (F) in the form of pellets.

The polymer (F) as above detailed may be used as binder for electrodes in Li-ion batteries.

A second object of the present invention pertains to an electrode-forming composition (C) comprising:
a) at least one electrode active material (AM);
b) at least one binder (B), wherein binder (B) comprises at least one polymer (F) as above defined; and
c) at least one solvent (S).

For the purpose of the present invention, the term "electro-active material (AM)" is intended to denote a compound which is able to incorporate or insert into its structure and substantially release therefrom alkaline or alkaline-earth metal ions during the charging phase and the discharging phase of an electrochemical device. The compound (AM) is preferably able to incorporate or insert and release lithium ions.

The nature of the compound (AM) in composition (C) depends on whether said composition is used in the manufacture of a positive electrode [electrode (Ep)] or a negative electrode [electrode (En)].

In the case of forming a positive electrode (Ep) for a Lithium-ion secondary battery, the compound (AM) may comprise a composite metal chalcogenide of formula $LiMQ_2$, wherein M is at least one metal selected from transition metals such as Co, Ni, Fe, Mn, Cr and V or a metal such as Al and a mixture of thereof and Q is a chalcogen such as O or S. Among these, it is preferred to use a lithium-based composite metal oxide of formula $LiMO_2$, wherein M is the same as defined above. Preferred examples thereof may include $LiCoO_2$, $LiNiO_2$, $LiNi_xCo_{1-x}O_2$ (0<x<1), $LiNi_aCo_bAl_cO_2$ (a+b+c=1) and spinel-structured $LiMn_2O_4$.

As an alternative, still in the case of forming a positive electrode (Ep) for a Lithium-ion secondary battery, the compound (AM) may comprise a lithiated or partially lithiated transition metal oxyanion-based electro-active material of formula $M_1M_2(JO_4)_fE_{1-f}$, wherein $M_1$ is lithium, which may be partially substituted by another alkali metal representing less than 20% of the $M_1$ metals, $M_2$ is a transition metal at the oxidation level of +2 selected from Fe, Mn, Ni or mixtures thereof, which may be partially substituted by one or more additional metals at oxidation levels between +1 and +5 and representing less than 35% of the $M_2$ metals, including 0, $JO_4$ is any oxyanion wherein J is either P, S, V, Si, Nb, Mo or a combination thereof, E is a fluoride, hydroxide or chloride anion, f is the molar fraction of the $JO_4$ oxyanion, generally comprised between 0.75 and 1.

The $M_1M_2(JO_4)_fE_{1-f}$ electro-active material as defined above is preferably phosphate-based and may have an ordered or modified olivine structure.

More preferably, the compound (AM) in the case of forming a positive electrode (Ep) has formula $Li_{3-x}M'_yM''_{2-y}(JO_4)_3$ wherein 0≤x≤3, 0≤y≤2, M' and M'' are the same or different metals, at least one of which being a transition metal, $JO_4$ is preferably $PO_4$ which may be partially substituted with another oxyanion, wherein J is either S, V, Si, Nb, Mo or a combination thereof. Still more preferably, the compound (AM) is a phosphate-based electro-active material of formula $Li(Fe_xMn_{1-x})PO_4$ wherein 0≤x≤1, wherein x is preferably 1 (that is to say, lithium iron phosphate of formula $LiFePO_4$).

In the case of forming a negative composite electrode (En) for a Lithium-ion secondary battery, the compound (AM) may preferably comprise a carbon-based material and/or a silicon-based material.

In some embodiments, the carbon-based material may be, for example, graphite, such as natural or artificial graphite, graphene, or carbon black.

These materials may be used alone or as a mixture of two or more thereof.

The carbon-based material is preferably graphite.

The silicon-based compound may be one or more selected from the group consisting of chlorosilane, alkoxysilane, aminosilane, fluoroalkylsilane, silicon, silicon chloride, silicon carbide and silicon oxide.

More particularly, the silicon-based compound may be silicon oxide or silicon carbide.

When present in compound (AM), the at least one silicon-based compound is comprised in the compound (AM) in an amount ranging from 1 to 30% by weight, preferably from 5 to 20% by weight with respect to the total weight of the compound (AM).

The solvent (S) may preferably be an organic polar one, examples of which may include: N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate, and trimethyl phosphate. These solvents may be used singly or in mixture of two or more species.

An optional conductive agent may be added in order to improve the conductivity of a resulting electrode (AM).

Examples thereof may include: carbonaceous materials, such as carbon black, graphite fine powder carbon nanotubes, graphene, or fiber, or fine powder or fibers of metals such as nickel or aluminum. The optional conductive agent is preferably carbon black. Carbon black is available, for example, under the brand names, Super P® or Ketjenblack®.

The electro-forming composition (C) of the invention may further optionally include at least one conductive agent.

When present, the conductive agent is different from the carbon-based material described above.

In a preferred embodiment of the present invention, an electrode-forming composition (C) for use in the preparation of a positive electrode (Ep) is provided, said composition comprising:
  a) at least one electrode active material (AM);
  b) at least one binder (B), wherein binder (B) comprises at least one polymer (F) as above defined;
  c) at least one solvent (S); and
  d) at least one conductive agent, preferably selected from carbon black or graphite fine powder carbon nanotubes.

As said above, the polymer (F) of the present invention possesses a quasi-linear structure, and very low amount of insoluble fraction when dissolved in standard polar aprotic solvents such as NMP.

Thanks to the low amount of insoluble components, polymer (F) provides solutions in organic solvents, which are not detrimentally affected by the presence of insoluble residues, which are generally referred as "gels", and are hence more adapted for use in formulating electrodes-forming compositions.

In another object, the present invention pertains to the use of the electrode-forming composition (C) for the manufacture of an electrode (E), said process comprising:
  (A) providing a metal substrate having at least one surface;
  (B) providing an electrode-forming composition (C) as above defined;
  (C) applying the composition (C) provided in step (B) onto the at least one surface of the metal substrate provided in step (A), thereby providing an assembly comprising a metal substrate coated with said composition (C) onto the at least one surface;
  (D) drying the assembly provided in step (C);
  (E) submitting the dried assembly obtained in step (iv) to a compression step to obtain the electrode (E) of the invention.

In a further object, the present invention pertains to the electrode (E) obtainable by the process of the invention.

The Applicant has surprisingly found that the electrode (E) of the present invention shows outstanding adhesion of the binder to current collector.

The electrode (E) of the invention is thus particularly suitable for use in electrochemical devices, in particular in secondary batteries.

For the purpose of the present invention, the term "secondary battery" is intended to denote a rechargeable battery.

The secondary battery of the invention is preferably an alkaline or an alkaline-earth metal secondary battery.

The secondary battery of the invention is more preferably a Lithium-ion secondary battery.

In still a further object, the present invention pertains to an electrochemical device comprising at least one electrode (E) of the present invention.

The electrochemical device according to the present invention, being preferably a secondary battery, comprises:
a positive electrode and a negative electrode,
wherein at least one of the positive electrode and the negative electrode is the electrode (E) of the present invention.

In one preferred embodiment of the present invention it is provided an electrochemical device is a secondary battery comprising:
a positive electrode and a negative electrode,
wherein the negative electrode is the electrode (E) according to the present invention.

An electrochemical device according to the present invention can be prepared by standard methods known to a person skilled in the art.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

EXPERIMENTAL PART

Determination of Intrinsic Viscosity of Polymer (F)

Intrinsic viscosity ($\eta$) [dl/g] was measured using the following equation on the basis of dropping time, at 25° C., of a solution obtained by dissolving the polymer (F) in N,N-dimethylformamide at a concentration of about 0.2 g/dl using a Ubbelhode viscosimeter:

$$[\eta] = \frac{\eta_{sp} + \Gamma \cdot \ln \eta_r}{(1+\Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r$–1, and $\Gamma$ is an experimental factor, which for polymer (F) corresponds to 3.

DSC Analysis

DSC analyses were carried out according to ASTM D 3418 standard; the melting point ($T_{f2}$) was determined at a heating rate of 10° C./min.

Determination of the Polar End-Groups

The amount of polar end groups of the polymers (F) arising from the initiator diethyl peroxydicarbonate used in the polymerization process, was determined by $^1$H-NMR, measuring the intensity of the H atoms of the $CH_2$ group (in bold in following formula) with respect to the total intensity of $CH_2$ moieties of the polymer (F) backbone VDF monomer units:

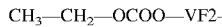

The content of end groups was calculated by applying the following formula:

$$[EG] = (I_{EG}/I_{VDF}) \times 10000$$

wherein:
[EG] is the content of the generic end-groups expressed as mols per 10000 VDF units,
$I_{EG}$ is the intensity, normalized to one hydrogen, of the integral of the end-group [EG]
$I_{VDF}$ is the intensity, normalized to one hydrogen, of the integrals of normal and reverse VDF recurring units.

About 20 mg of polymer were dissolved in 0.7 ml of hexadeuteroacetone. The $^1$H-NMR spectrum revealed the aforementioned $CH_2$ at 4.24 ppm whereas $CH_2$ signals from VDF recurring normal and reverse units resonated as broad peaks centered at 3.2 and 2.5 ppm respectively.

Determination of the Amount of Monomers AA, AGE and DEGEEA in the Polymer (F) by NMR Alternated AA, AGE and DEGEEA content in the polymer (F) was determined by $^{19}$F-NMR spectroscopy.

Signals related to $CF_2$ moieties of VDF units (in bold in following formula) adjacent to isolated hydrogenated comonomers have been found to resonate at about –94 ppm in the $^{19}$F-NMR.

R is $R_x$ or $R_H$ as above defined.

From the ratio between the normalized intensities of this signal and those of all the VDF peaks in the spectrum it is possible to determine the average number of comonomer statistically inserted between two VDF units.

The global amount of DEGEEA and AEG is calculated by $^1$H-NMR spectra.

For example for the DEGEEA, it is found that the ending ethoxyl groups resonate at 3.5 ppm ($CH_2$) and 1.15 ppm ($CH_3$), whereas typical signals from VDF are known to be at about 2.9 and 2.4 ppm (normal and reverse units, respectively).

It is evident that from the ratio between the normalized intensities of the $CH_3$ signal and those for the VDF it is possible to determine the total number of DEGEEA monomer, so the AA content given below is estimated by the difference from the total acrylic content sequence obtained by $^{19}$F-NMR (VDF-(comonomer)-VDF) and the total amount of DEGEEA.

For the polymers below (F-1 and F-2) the way they are produced, continuous feeding of both monomers, we may estimate a very high alternance that makes the composition values estimation very close to the real values.

Example 1: Preparation of Polymer F-1

In a 4 L reactor equipped with an impeller running at a speed of 650 rpm were introduced in sequence: 2373 g of demineralized water and 0.4 g of PEO (Alkox®-E45 from Alroko) per kg of total monomers and 0.5 g of hydroxypropyl methylcellulose (Methocel®-K100 from Dow) per kg of total monomers and 82.11 g of a solution of trisodium phosphate. The oxygen present in the reactor was removed with a sequence of vacuum and purge of nitrogen at a fixed temperature of 14° C. This sequence was repeated 3 times.

Then, 12.93 g of hydrogen peroxide solution (from Brenntag) and 4.70 g of ethyl chloroformate (from Framochem) were introduced in the reactor.

After 15 minutes, 0.18 g of acrylic acid (AA) and 0.11 g of di(ethylene glycol) ethyl ether acrylate (DEGEEA) were introduced in the reactor at a stirring speed of 880 rpm. Immediately after, 1170 g of VDF were added to the mixture. The reactor was then gradually heated until the set-point temperature of 35° C. was reached.

The pressure was kept constantly equal to 120 bars during the whole polymerization run by feeding an aqueous solution comprising 4.16 g of AA per liter of solution and 2.50 g of DEGEEA per liter of solution. A total of 664 g of the solution was charged to the reactor. After 420 minutes the polymerization was stopped by degassing the suspension until reaching atmospheric pressure.

The polymer was then collected by filtration and suspended against clean water in a stirred tank. After the washing treatment, the polymer was dried in an oven at 65° C. overnight. 871 g of dry powder were collected.

A polymer comprising VDF-AA (0.22% by moles)-DEGEEA (0.02% by moles), having an intrinsic viscosity of 0.255 l/g in DMF at 25° C. and a $T_2f$ of 169.8° C. was obtained.

The polymer contained 3.6/10000 VDF units of the end-group $CH_3CH_2$—OCOO—.

In addition, the presence of 3.9/10000 VDF units of —$CF_2H$ and 2.3/10000 VDF units of —$CF_2CH_3$ end-groups was determined Example 2: Preparation of Polymer F-2

In a 4 L reactor equipped with an impeller running at a speed of 650 rpm were introduced in sequence: 2,334 g of demineralized water and 0.4 g of PEO (Alkox®-E45 from Alroko) per kg of total monomers and 0.5 g of hydroxypropyl methylcellulose (Methocel®-K100 from Dow) per kg of total VDF monomers and 82.11 g of a solution of trisodium phosphate. The oxygen present in the reactor was removed with a sequence of vacuum and purge of nitrogen at a fixed temperature of 14° C. This sequence was repeated 3 times.

Then, 12.93 g of hydrogen peroxide (from Brenntag) and 4.70 g of ethyl chloroformate (from Framochem) were introduced in the reactor.

After 15 minutes, 0.18 g of acrylic acid (AA) and 0.05 g of allyl glycidyl ether (AGE) were introduced in the reactor at a stirring speed of 880 rpm. Immediately after, 1172 g of VDF was added to the mixture. The reactor was then gradually heated until the set-point temperature of 40° C. was reached.

The pressure was kept constantly equal to 120 bars during the whole polymerization run by feeding an aqueous solution comprising 4.03 g of AA per liter of solution and 1.21 g of AGE per liter of solution. A total of 683.8 g of the AA and AGE water solution was charged to the reactor. After 189 minutes the polymerization was stopped by degassing the suspension until reaching atmospheric pressure.

The polymer was then collected by filtration and suspended against clean water in a stirred tank. After the washing treatment, the polymer was dried in an oven at 65° C. overnight. 855 g of dry powder were collected.

A polymer VDF-AA (0.19% by moles)-AGE (0.01% by moles), having an intrinsic viscosity of 0.296 l/g in DMF at 25° C. and a $T_2f$ of 168.9° C. was obtained.

The polymer contained 2.4/10000 VDF units of the end-group $CH_3CH_2$—OCOO—.

In addition, the presence of 2.8/10000 VDF units of —$CF_2H$ and 1.8/10000 VDF units of —$CF_2CH_3$ end-groups was determined.

Example 3 Comparative: Preparation of Polymer a

In a 4 L reactor equipped with an impeller running at a speed of 650 rpm were introduced in sequence: 2,369 g of demineralized water and 0.4 g of PEO (Alkox®-E45 from Alroko) per kg of total monomers and 0.5 g of hydroxypropyl methylcellulose (Methocel®-K100 from Dow) per kg of total monomers and 82.11 g of a solution of trisodium phosphate. The oxygen present in the reactor was removed with a sequence of vacuum and purge of nitrogen at a fixed temperature of 14° C. This sequence was repeated 3 times.

Then, 12.93 g of hydrogen peroxide solution (from Brenntag) and 4.70 g of ethyl chloroformate (from Framochem) were introduced in the reactor.

After 15 minutes, 0.11 g of of di(ethylene glycol) ethyl ether acrylate (DEGEEA) was introduced in the reactor at a stirring speed of 880 rpm. Immediately after, 1174 g of VDF were added to the mixture. The reactor was then gradually heated until the set-point temperature of 35° C. was reached.

The pressure was kept constantly equal to 120 bars during the whole polymerization run by feeding an aqueous solution comprising 2.49 g of D EGEEA per liter of solution. A total of 666 g of the DEGEEA water solution was charged to the reactor. After 186 minutes the polymerization was stopped by degassing the suspension until reaching atmospheric pressure.

The polymer was then collected by filtration and suspended against clean water in a stirred tank. After the washing treatment, the polymer was dried in an oven at 65° C. overnight. 873 g of dry powder were collected.

Polymer VDF-DEGEEA (0.02% by moles), having an intrinsic viscosity of 0.259 l/g in DMF at 25° C. and a $T_{2f}$ of 171.0° C. was obtained.

The polymer contained 3.2/10000 VDF units of the end-group $CH_3CH_2$—OCOO—.

In addition, the presence of there are 3.7/10000 VDF units of —$CF_2H$ and 2.1/10000 units of —$CF_2CH_3$ end-groups was determined.

Example 4 Comparative: Preparation of Polymer B

In a 4 L reactor equipped with an impeller running at a speed of 650 rpm were introduced in sequence: 2,205 g of demineralized water and 0.4 g of PEO (Alkox®-E45 from Alroko) per kg of total monomers and 0.5 g of hydroxypropyl methylcellulose (Methocel®-K100 from Dow) per kg of total monomers. The oxygen present in the reactor was removed with a sequence of vacuum and purge of nitrogen at a fixed temperature of 11° C. This sequence was repeated 3 times.

Then, 0.18 g of acrylic acid (AA), 4.62 g of a solution of the initiator t-amylperpivalate (from United Initiators) in isododecane (75%) and 6.17 g of diethyl carbonate were introduced in the reactor. Immediately after, 1176 g of VDF were added to the mixture. The reactor was then gradually heated until the set point temperature of 50° C. was reached.

The pressure was kept constantly equal to 120 bars during the whole polymerization run by feeding an aqueous solution comprising 3.33 g of AA per liter of solution. A total of 830 g of the AA water solution was charged to the reactor. After 354 minutes the polymerization was stopped by degassing the suspension until reaching atmospheric pressure.

The polymer was then collected by filtration and suspended against clean water in a stirred tank. After the washing treatment, the polymer was dried in an oven at 65° C. overnight. 987 g of dry powder were collected.

Polymer VDF-AA (0.2% by moles), polymer having an intrinsic viscosity of 0.286 l/g in DMF at 25° C. and a $T_2f$ of 169.6° C. was obtained.

The polymer contained: 1.1/10000 VDF units of —C(CH$_3$)$_3$, 3.4/10000 VDF units of —CF$_2$H and 2.1/10000 VDF units of —CF$_2$CH$_3$ end-groups.

No end groups CH$_3$CH$_2$—OCOO— were present.

Example 5 Comparative: Preparation of Polymer C

In a 4 L reactor equipped with an impeller running at a speed of 650 rpm were introduced in sequence: 2,014 g of demineralized water and 0.4 g of PEO (Alkox®-E45 from Alkorox) per kg of total VDF monomers and 0.5 g of hydroxypropyl methylcellulose (Methocel®-K100 from Dow) per kg of total VDF monomers and 59.91 g of a solution of trisodium phosphate. The oxygen present in the reactor was removed with a sequence of vacuum and purge of nitrogen at a fixed temperature of 14° C. This sequence was repeated 3 times.

Then, 30 g of demineralized water, 11.28 g of hydrogen peroxide (from Brenntag) and 3.53 g of ethyl chloroformiate (from Framochem) were introduced in the reactor.

After 15 minutes, 0.28 g of acrylic acid (AA) and 0.07 g of hydroxyethyl acrylate (HEA) were introduced in the reactor at a stirring speed of 880 rpm. Immediately after, 1.166 g of VDF were added to the mixture. The reactor was then gradually heated until the set-point temperature of 45° C. was reached, corresponding to a pressure of the reactor of 120 bars.

The pressure was kept constantly equal to 120 bars during the whole polymerization run by feeding an aqueous solution comprising 9.40 g of AA per liter of solution and 4.70 g of HEA per liter of solution. After 365 minutes the polymerization was stopped by degassing the suspension until reaching atmospheric pressure. A total of 721 g of the AA and HEA solution was charged to the reactor.

The polymer was then collected by filtration and suspended against clean water in a stirred tank. After the washing treatment, the polymer was dried in an oven at 65° C. for twelve hours. 919 g of dry powder were collected.

A polymer comprising VDF-AA (0.45% by moles)-HEA (0.15% by moles), having an intrinsic viscosity of 0.28 l/g in DMF at 25° C. and a $T_2f$ of 165.5° C. was obtained The polymer contained 3.0/10000 VDF units of the end-group CH$_3$CH$_2$—OCOO—.

In addition, the presence of 4.5/10000 VDF units of —CF$_2$H and 2.5/10000 VDF units of —CF$_2$CH$_3$ end-groups was determined.

General Preparation of the Electrodes with NMC Active Material

The positive electrodes having final composition of 96.5% by weight of NMC, 1.5% by weight of polymer, 2% by weight of conductive additive were prepared as follows.

A first dispersion was prepared by pre-mixing for 10 minutes in a centrifugal mixer 34.7 g of a 6% by weight solution of a polymer in NMP, 133.8 g of NMC, 2.8 g of SC-65 and 8.8 g of NMP.

The mixture was then mixed using a high speed disk impeller at 2000 rpm for 50 minutes. Additional 7.2 g of NMP were subsequently added to the dispersion, which was further mixed with a butterfly type impeller for 20 minutes at 1000 rpm. Positive electrodes were obtained by casting the as obtained compositions on 15 μm thick Al foil with doctor blade and drying the as coated layers in a vacuum oven at temperature of 90° C. for about 50 minutes. The thickness of the dried coating layers was about 110 μm.

Slurry Viscosity Measurement

The slurry viscosity was measured with an AntonPaar Rheolab QC using a Concentric cylinder setup (Measuring Cup: C-CC27/QC-LTD Bob: CC27/P6) with peltier temperature control at 25° C. Steady state viscosities were measured from shear rate of 0.1 to 200 1/s.

Adhesion Measurement

Adhesion Peeling Force Between Aluminium Foil and Electrode:
180° peeling tests were performed following the setup described in the standard ASTM D903 at a speed of 300 mm/min at 20° C. in order to evaluate the adhesion of the dried coating layer to the Al foil.

Example 6: Adhesion and Slurry Viscosity

The polymers of examples 1 to 4 have been used as binders and the electrode compositions have been produced according to the procedure shown above. The values of slurry viscosity and adhesion are shown in Table 1.

TABLE 1

| Polymer | IV [l/g] | Adhesion [N/m] | Slurry Viscosity, (mPa*s)@ (1/s) |
|---|---|---|---|
| F-1 | 0.255 | 205 | 4800 |
| F-2 | 0.296 | 214 | 10980 |
| A | 0.259 | 111 | 11000 |
| B | 0.286 | 177 | 7600 |
| C | 0.28 | 188 | 5580 |

The results show that the polymers of the present invention are more performing and easier to be handled in the fabrication process of electrodes thanks to a low slurry viscosity and an excellent adhesion to the current collector in comparison with polymers including one comonomer only and in comparison with copolymers of the prior art. It has been demonstrated that the presence of a very low content of both monomers (HA) and (CA) provides surprising effects both on the slurry viscosity of the electrode-forming compositions and the adhesion of the electrodes to the current collector.

The invention claimed is:

1. A fluoropolymer, polymer (F), comprising:
(i) recurring units derived from vinylidene fluoride (VDF) monomer;
(ii) recurring units derived from at least one vinyl monomer (HA) of formula (I)

wherein $R^1$, $R^2$ and $R^3$, equal to or different from each other, are independently selected from a hydrogen atom, a halogen atom, and a $C_1$-$C_5$ hydrocarbon group, and wherein $R_x$ is a is a $C_3$-$C_{20}$ linear or branched hydrocarbon chain moiety comprising at least two functional groups independently selected from the group consisting of ether epoxy, per-carbonate, and ester;

(iii) recurring units derived from at least one carboxyl group-containing vinyl monomer (CA), wherein monomer (CA) is different from monomer (HA);

wherein the total amount of monomer (HA) and monomer (CA) in said polymer (F) is of at most 5.0% by moles, with respect to the total moles of recurring units of polymer (F); and wherein at least 50% of monomer (CA) is randomly distributed into said polymer (F).

2. The polymer (F) according to claim 1, wherein $R_x$ in formula (I) is a $C_3$-$C_{20}$ linear or branched hydrocarbon chain moiety comprising at least three functional groups independently selected from the group consisting of ether, epoxy, per-carbonate, and ester.

3. The polymer (F) according to claim 1, wherein monomer (HA) is selected from the group consisting of:
allyl glycidyl ether (AGE),
di(ethylene glycol) ethyl ether acrylate
(meth) acryloyloxyalkyl succinic acid;
and mixtures thereof.

4. The polymer (F) according to claim 1, wherein monomer (CA) is a compound of formula (II):

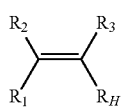

(II)

wherein:
$R^1$, $R^2$ and $R^3$, equal to or different from each other, are independently selected from a hydrogen atom, a halogen atom and a $C_1$-$C_3$ hydrocarbon group and $R_H$ is a $C_2$-$C_{10}$ hydrocarbon moiety comprising at least one carboxyl group.

5. The polymer (F) according to claim 4, wherein monomer (CA) is selected from the group consisting of:
acrylic acid (AA),
(meth) acrylic acid,
2-carboxyethyl (meth) acrylate,
3-butenoic acid,
(meth) acryloyloxyethyl succinic acid,
(meth) acryloyloxypropyl succinic acid,
3-(allyloxy) propanoic acid,
and mixtures thereof.

6. The polymer (F) according to claim 1, wherein the molar ratio between recurring units (ii) and recurring units (iii) in polymer (F) is in the range from 20:1 to 1:20.

7. The polymer (F) according to claim 1, wherein polymer (F) comprises end groups of formula (III):

(III)

wherein RO is a divalent radical containing at least one oxygen atom, $R_a$ is a $C_1$-$C_5$ linear or branched hydrocarbon group and $R_b$ is hydrogen or a $C_1$-$C_5$ linear or branched hydrocarbon group and x is an integer selected from 1 and zero, wherein said end groups are present in an amount of at least 1/10000 VDF units.

8. The polymer (F) according to claim 7, wherein the divalent radical RO is selected from the group consisting of:

ether,
ester,
ketone,
epoxide, and
per-carbonate groups.

9. A process for the preparation of polymer (F) according to claim 1, said process comprising polymerizing a vinylidene fluoride (VDF) monomer, a monomer (HA) and a monomer (CA), and optionally a comonomer (CF), in an aqueous medium in the presence of a radical initiator, said process comprising:
continuously feeding an aqueous solution comprising monomer (HA) and monomer (CA); and
maintaining the pressure in said reactor vessel exceeding the critical pressure of the vinylidene fluoride.

10. An electrode-forming composition (C) comprising:
a) at least one electrode active material (AM);
b) at least one binder (B), wherein binder (B) comprises at least one polymer (F) according to claim 1; and
c) at least one solvent(S).

11. A process of manufacture of an electrode (E), said process comprising:
(A) providing a metal substrate having at least one surface;
(B) providing the electrode-forming composition (C) according to claim 10;
(C) applying the composition (C) provided in step (B) onto the at least one surface of the metal substrate provided in step (A), thereby providing an assembly comprising a metal substrate coated with said composition (C) onto the at least one surface;
(D) drying the assembly provided in step (C);
(E) submitting the dried assembly obtained in step (D) to a compression step to obtain the electrode (E).

12. An electrode (E) obtained by the process according claim 11.

13. An electrochemical device comprising at least one electrode (E) according to claim 12.

14. The polymer (F) according to claim 1, wherein the total amount of monomer (HA) and monomer (CA) in said polymer (F) is of at most 1.5% by moles with respect to the total moles of recurring units of polymer (F).

15. The polymer (F) according to claim 1, wherein Rx in formula (I) is a $C_4$-$C_{15}$ linear or branched hydrocarbon chain moiety comprising at least three functional groups independently selected from the group consisting of ether, epoxy, per-carbonate, and ester.

16. The polymer (F) according to claim 1, wherein the molar ratio between recurring units (ii) and recurring units (iii) in polymer (F) is in the range from 10:1 to 1:10.

17. The polymer (F) according to claim 1, wherein both monomer (HA) and monomer (CA) are randomly distributed into said polymer (F) and the total percentage of randomly distributed monomers (HA) and (CA) is of at least 70%.

18. The polymer (F) according to claim 7, wherein said end groups are present in an amount of at least 1.5/10000 VDF units.

19. The polymer (F) according to claim 1, wherein the total amount of monomer (HA) is of at least 0.001% by moles, and the total amount of monomer (CA) is of at least 0.01% by moles, with respect to the total moles of recurring units of polymer (F).

20. A fluoropolymer, polymer (F), comprising:
(i) recurring units derived from vinylidene fluoride (VDF) monomer;

(ii) recurring units derived from at least one vinyl monomer (HA) of formula (I)

$$R^1R^2C=CR^3-R_x \quad (I)$$

wherein $R^1$, $R^2$ and $R^3$, equal to or different from each other, are independently selected from a hydrogen atom, a halogen atom, and a $C_1$-$C_5$ hydrocarbon group, and wherein $R_x$ is a is a $C_3$-$C_{20}$ linear or branched hydrocarbon chain moiety comprising at least two functional groups independently selected from the group consisting of ether, ketone, epoxy, per-carbonate, and ester;

(iii) recurring units derived from at least one carboxyl group-containing vinyl monomer (CA), wherein monomer (CA) is different from monomer (HA);

wherein the total amount of monomer (HA) and monomer (CA) in said polymer (F) is of at most 5.0% by moles, with respect to the total moles of recurring units of polymer (F);

wherein at least 50% of monomer (CA) is randomly distributed into said polymer (F), and wherein polymer (F) further comprises comonomer (CF) in an amount of from 0.1 to 10.0% by moles with respect to the total moles of recurring units of polymer (F), wherein comonomer (CF) is a fluorinated monomer different from VDF.

* * * * *